J. F. BLOCK.
HOG CATCHER AND TURNER.
APPLICATION FILED JUNE 6, 1919.
1,342,893.
Patented June 8, 1920.
4 SHEETS—SHEET 1.
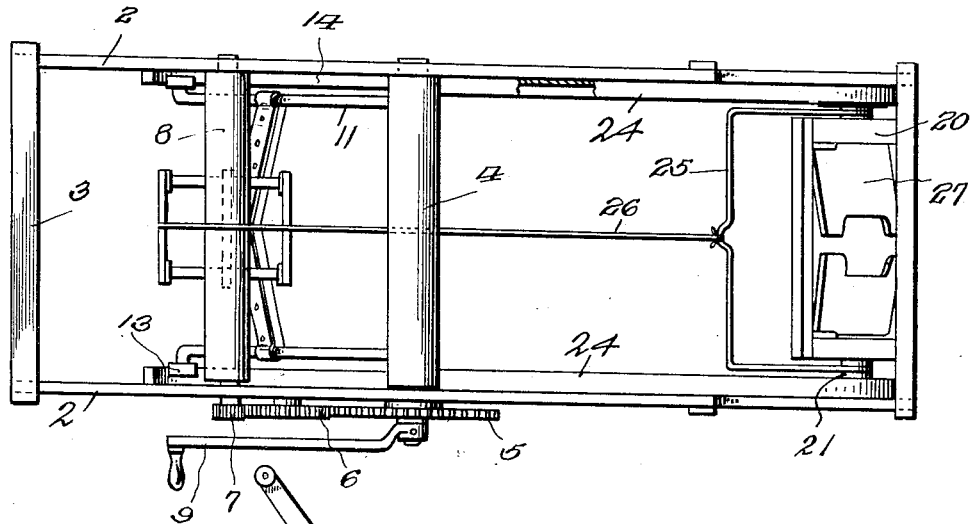
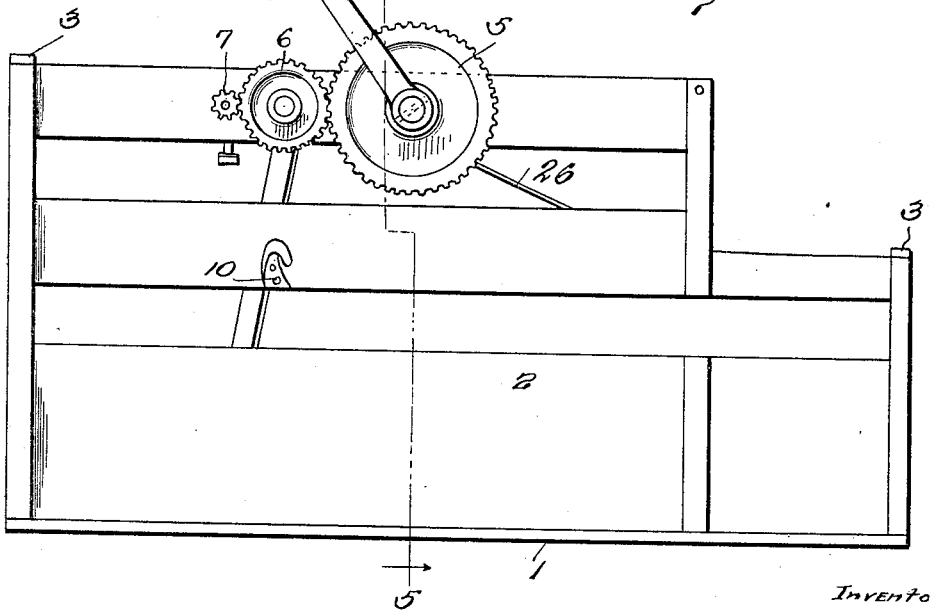
Inventor:
J. F. Block.

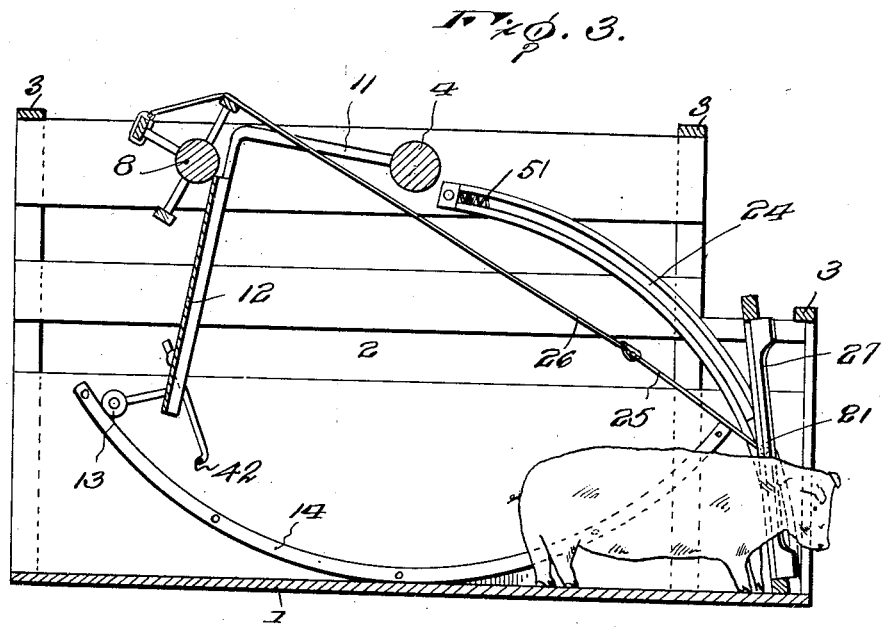
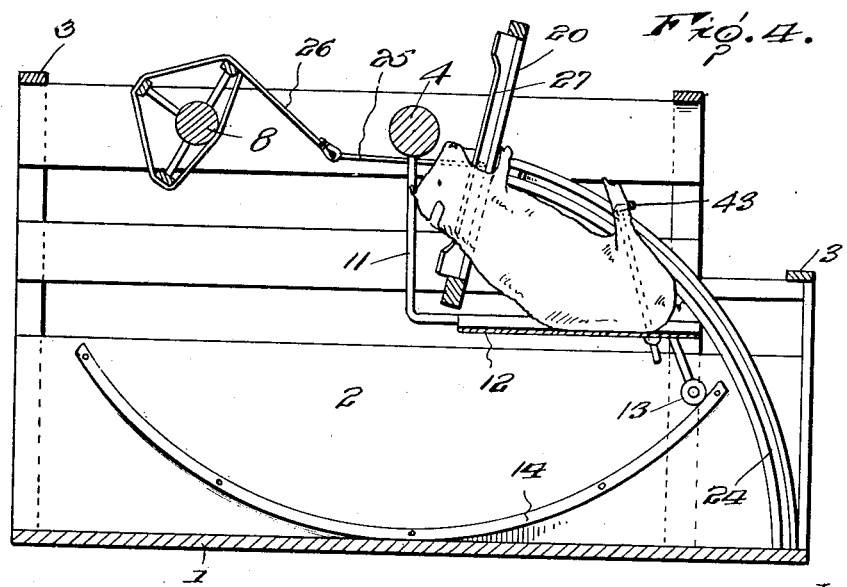

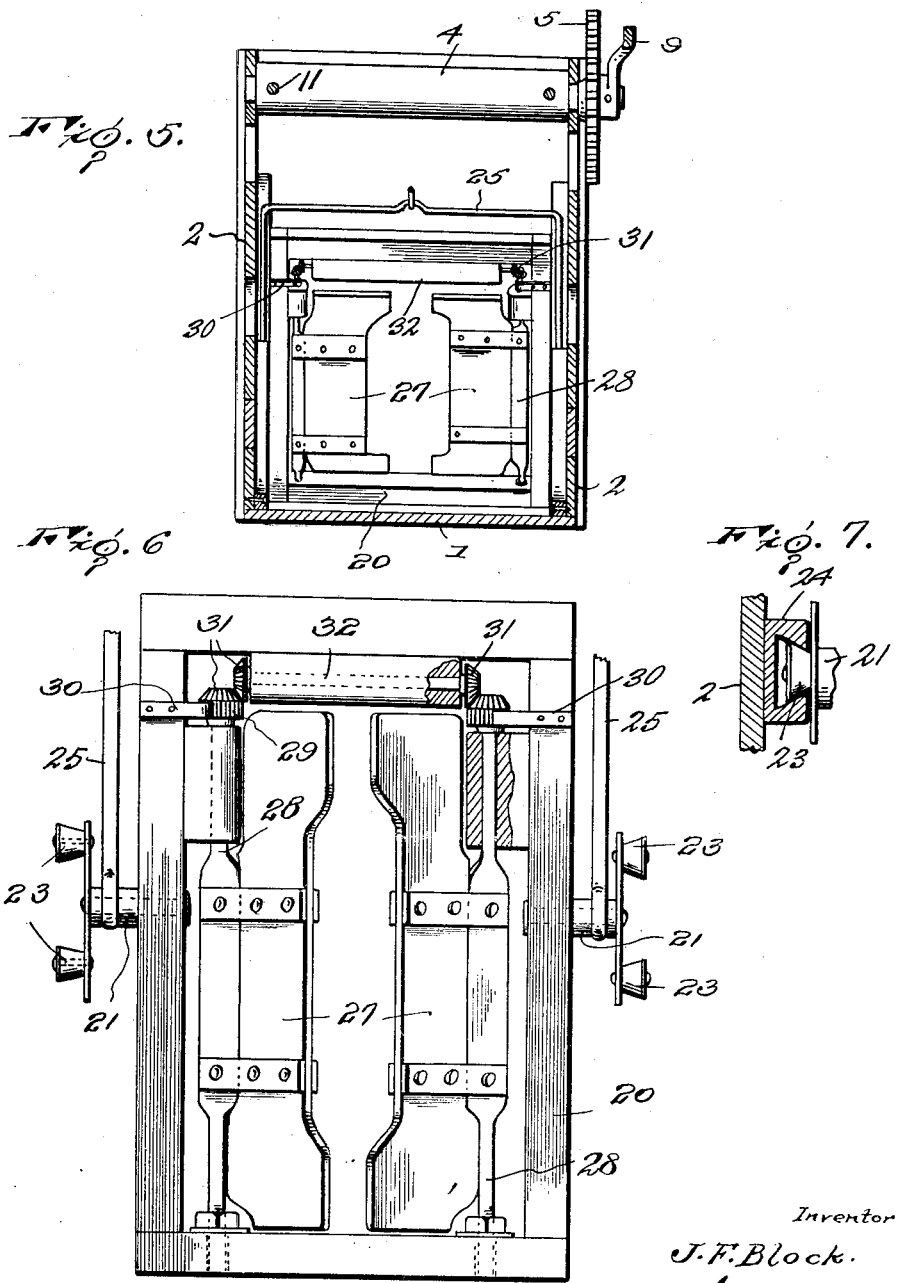

J. F. BLOCK.
HOG CATCHER AND TURNER.
APPLICATION FILED JUNE 6, 1919.
1,342,893.
Patented June 8, 1920.
4 SHEETS—SHEET 4.
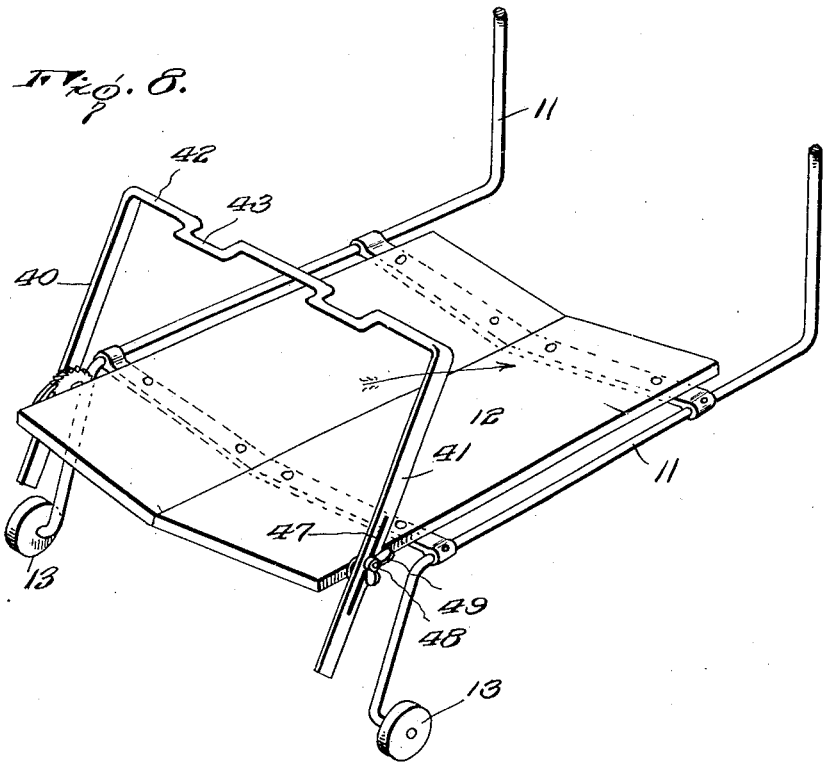
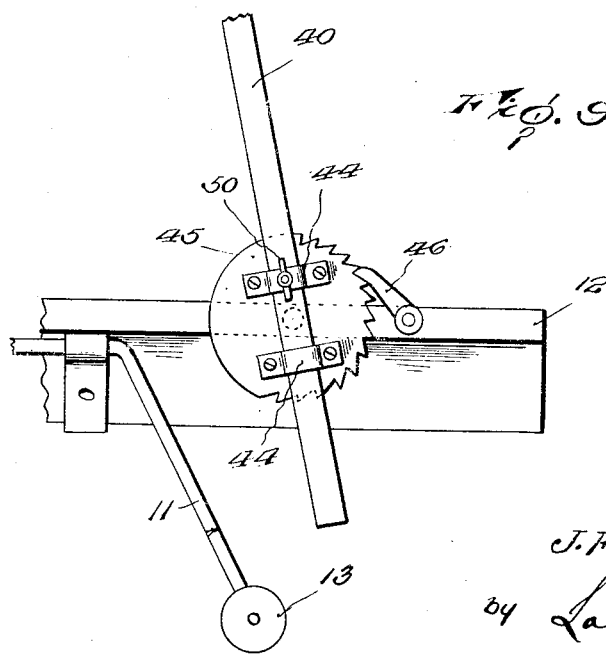
Inventor:
J. F. Block.
by Larry Lacey,
Attorneys.

UNITED STATES PATENT OFFICE.

JOHN F. BLOCK, OF KNOXVILLE, ILLINOIS.

HOG CATCHER AND TURNER.

1,342,893.

Specification of Letters Patent.

Patented June 8, 1920.

Application filed June 6, 1919. Serial No. 302,289.

*To all whom it may concern:*

Be it known that I, JOHN F. BLOCK, a citizen of the United States, residing at Knoxville, in the county of Knox and State of Illinois, have invented certain new and useful Improvements in Hog Catchers and Turners, of which the following is a specification.

This invention relates to animal husbandry, and more especially to catching and restraining devices; and it has for its object to produce a device of this kind into which an animal and more particularly a hog may be driven and caught, after which he may be turned upon his back for treatment, and there held without danger to the animal or operator. Later the animal may be restored to his normal position, and permitted to pass out of the device.

The invention comprises broadly a grapple or neck yoke, a swinging platform or table, and mechanism operable at the will of the attendant for moving the neck yoke upward through a curved path and the table simultaneously downward through a curved path when it is desired to turn the animal on his back, or for reversing the movement of parts when it is desired to restore him to normal position.

The invention also comprises details of the several parts and their coaction, and my preferred construction is more fully set forth in the following specification and claims. In the accompanying drawings—

Figure 1 is a plan view of the apparatus,

Fig. 2 is a side elevation,

Fig. 3 is a longitudinal section, showing the hog in position,

Fig. 4 is another longitudinal section showing the parts in the position they occupy after the hog has been turned on his back, Fig. 5 is a vertical section on the line 5—5 of Fig. 2, Fig. 6 is a sectional detail showing the ratchet mechanism for holding the wings in the frame of the neck yoke, Fig. 7 is an enlarged detail sectional view through a portion of the apparatus.

Fig. 8 is an enlarged perspective view of the table and leg fastener.

Fig. 9 is a still further enlarged detail showing the arm of said fastener which is at the rear in Fig. 8.

Rising from a base 1 are sides 2 preferably slatted and connected at their upper edges at suitable points as at 3, the whole constituting a runway whose left end in the several views is the entrance for the hog or other animal to be treated. Across this runway near its top and at about its center is journaled a main shaft 4 having on its front end a large gear 5 connected by a countergear 6 with a small gear 7 fastened on the shaft of a windlass or drum 8, and a handle or lever 9 projects from the main shaft or may well be secured across the main gear 5 and is adapted to engage a hook or similar element 10 when it is turned down as will be described. This gearing and the lever and hook stand at what we may well call the front side of the device, as it appears in Fig. 2.

Projecting rigidly from the main shaft are arms 11 shaped about as shown in Fig. 3, their outer portions carrying a table 12 beyond which the arms are bent and carry wheels or rollers 13 adapted to travel on curved tracks 14 fixed within the sides of the runway on arcs struck around the main shaft. When the table is swung up and toward the inlet as seen in Fig. 3, the hog can enter beneath it.

A grapple or neck yoke is mounted for movement at the forward or outlet end of the runway, or in other words, beyond the position of the table. As here shown it consists of a frame 20 having trunnions 21 at its opposite sides carrying rollers 23 traveling in grooved trackways 24 which are mounted within the sides of the runway and curved upwardly and rearwardly from its outlet end as shown, and a bail 25 has its ends connected with said trunnions, while a rope or cord 26 leads from the bail to and is wound on the drum or windlass 8. Hingedly mounted within the frame are doors or wings 27 whose shafts 28 have ratchet wheels 29 engaged by pawls 30 in such manner that these wings may not swing forwardly as the animal pushes them, but may swing backward when he seeks to withdraw his head from between them. The shafts are also connected by gears 31 and a cross shaft 32 to cause them to move in unison.

A leg fastener is also by preference employed, the same having the construction best seen on the last sheet of the drawings. It comprises a bail of U-shape having parallel side arms 40 and 41 connected by a cross bar 42 which has bends or loops 43 spaced to embrace the animal's hind legs. The arm 40 passes through a pair of straps or keepers 44 on a ratchet wheel 45 pivoted to one edge of the table and engaged by a pawl 46, while the arm 41 where it passes the other edge of the table is slotted as at 47, the slot moving over a screw 48 onto which is run a thumb nut 49. Also, a set screw 50 may be passed through one of the keepers 44 against the arm 40. The leg fastener is thus both pivotally and adjustably mounted on the table near its free end.

As illustrated in Fig. 3, the upper portion of each arcuate guideway or track 24 is provided with a coil spring 51 which serves to limit and consume the upward movement of the frame 20.

In the use of this device, the parts will stand first as seen in Figs. 1, 2 and 3, that is, with the table raised and the yoke lowered. The hog is driven in at the inlet end of the runway, passes under the table, puts his head through the yoke as the wings stand open to a certain extent to induce, finds himself caught, then seeks to withdraw his head, and thus turns the wings back as their pawl and ratchet mechanism permits, so that in effect the animal locks his head in the neck yoke without attention on the part of anyone. The operator now moves the lever or handle 9 downward and engages it with the hook 10. This turns the main shaft, and through the gearing it rotates the windlass or drum. The rope is wound on the latter, and the neck yoke is raised by draft on the bail, the rollers 23 traveling up the trackways 24, and thereby the head of the animal is elevated. Meanwhile the rotation of the main shaft causes the table 12 to swing downward so that the hind quarters of the animal are borne forward and upward simultaneously with the upward and rearward movement of his fore quarters, and the result is that by the time the lever 9 has been engaged with the hook 10, the animal has been turned on his back. The leg fastener is now swung over as indicated by the arrow in Fig. 8 and the hind legs fastened as shown in Fig. 4, and the animal is thus secured in convenient position, ready for treatment or operation. After the same is over, a reversal of this operation restores the animal to his normal position; and, when the pawls for locking the leg clamp and wings are tripped, he feels himself free and will rush ahead out of the runway so that the device is ready for handling the next hog.

Having thus described the invention, what is claimed as new is:

1. A hog turning device including a rotary element, a table rigidly connected to the rotary element, a head engaging device having its sides provided with spaced trunnions, a pair of guide members receiving said spaced trunnions for directing the movement of said head engaging device in an arcuate path, and means coöperating with said table and said head engaging device for operating the same in unison.

2. In a hog holding machine, a runway, trackways therein rising from its outlet end toward its inlet end, neck gripping mechanism movable in said trackways, a table near the inlet end of the runway, means for swinging it downward and forward, and operating means for said gripping mechanism connected with the table swinging means.

3. In a hog holding machine, a runway, trackways therein rising from its outlet end toward its inlet end, neck gripping mechanism movable in said trackways, a main shaft rotatable in said runway, a table swung downward and forward in the runway by the turning of the shaft, and connections between the shaft and gripping mechanism for simultaneously raising the latter in its trackways as said shaft is turned.

4. In a hog holding machine, a runway, trackways therein rising from its outlet end toward its inlet end, neck gripping mechanism movable in said trackways, a main shaft rotatable in said runway, a table swung downward and forward in the runway by the turning of the shaft, a drum journaled in said runway and rotated by the turning of the main shaft, and a rope wound on the drum and connected with the gripping mechanism whereby the latter is raised as the table descends.

5. In a hog catcher and turner, the combination with a runway, tracks therein curving upward and rearward from its outlet, a main shaft journaled across its top, other tracks within the runway near its inlet end struck on curves around said shaft, and a windlass geared to the shaft; of a neck yoke having trunnions traveling in the first-named tracks, a bail mounted on said trunnions, a rope leading from the bail to the windlass, a table having rollers traveling on the last-named tracks, and arms connecting the table with the main shaft.

6. In a hog catcher and turner, the combination with a runway, tracks in its sides inclined from its outlet end toward its center, a neck yoke having rollers movable in said tracks, a windlass journaled in the runway, and a rope wound thereon and leading to said neck yoke; of a main shaft journaled in the runway, a table carried by said shaft, gearing connecting the shaft and windlass for rotating the latter as the table is swung downward and forward within the runway, an operating handle connected with the main shaft, and means for latching the handle when the parts have been moved to turn the hog on his back.

7. In a hog holder, the combination with a runway, tracks therein, a frame having trunnions projecting into said tracks, a bail engaging the trunnions, and means for moving the bail; of wings hinged within the frame, means for resisting their opening movement in the passage of the animal's head between them, and means coöperating with said frame for upsetting the hog.

8. In a hog catcher, a runway, a frame therein, shafts mounted within the frame and carrying wings, ratchet wheels on the shafts, pawls on the frame engaging the wheels for limiting the opening movement of the wings as the animal pushes between them but permitting them to swing to the rear as he seeks to withdraw his head, and means whereby the frame may be swung in an arcuate path for upsetting the hog.

9. In a hog catcher, a runway, a frame therein, upright shafts mounted in the frame, connections to cause their simultaneous rotation in opposite directions, wings fastened on the shafts, pawl-and-ratchet mechanism for limiting the opening movement but permitting the closing movement of the wings, means coöperating with said frame whereby the hog may be upset.

10. In a hog holding machine, neck gripping mechanism, a table, a pivoted and adjustable leg fastener carried by said table, and means for simultaneously moving the neck gripping mechanism upward and rearward and the table and its leg fastener downward and forward whereby the animal is turned on its back as described.

11. In a hog holding machine, the combination with a runway, trackways therein rising from its outlet end toward its inlet end, and neck gripping mechanism movable in said trackways; of a main shaft mounted across the runway, a table swung downward and forward into the runway by the turning of said shaft, connections between the shaft and neck grip for raising the latter when the shaft is turned, and leg fastening mechanism carried by the table near its free edge.

12. In a machine of the class described, the combination with a runway, a table movably mounted therein, and means for swinging the table to reverse its position; of a leg fastener comprising a U-shaped bail whose arms pass the edges of the table and whose center crosses the table and has loops for the legs, and means for adjustably fastening said arms to the table.

13. In a hog holder, a table, a ratchet wheel pivoted to one edge thereof, a pawl for the ratchet, keepers on the ratchet, a screw projecting from the other edge of the table opposite the pivot of the ratchet, a thumb nut on said screw, and a U-shaped leg fastener whereof one arm passes through said keepers and the other arm has a slot mounted on said screw beneath the thumb nut.

In testimony whereof I affix my signature.

JOHN F. BLOCK. [L. S.]